United States Patent
Purdy et al.

(10) Patent No.: US 12,116,677 B2
(45) Date of Patent: *Oct. 15, 2024

(54) CORROSION INHIBITION PACKAGE

(71) Applicant: Dorf Ketal Chemicals FZE, Fujairah (AE)

(72) Inventors: Clay Purdy, Medicine Hat (CA); Markus Weissenberger, Calgary (CA)

(73) Assignee: Dorf Ketal Chemicals FZE, Fujairah (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,535

(22) Filed: Jan. 12, 2023

(65) Prior Publication Data

US 2023/0151496 A1 May 18, 2023

Related U.S. Application Data

(63) Continuation of application No. 16/465,665, filed as application No. PCT/CA2017/000256 on Nov. 30, 2017, now Pat. No. 11,591,696.

(30) Foreign Application Priority Data

Dec. 2, 2016 (CA) .................................... 2950370

(51) Int. Cl.
| | | |
|---|---|---|
| *C23F 11/04* | (2006.01) | |
| *C09K 8/52* | (2006.01) | |
| *C09K 8/54* | (2006.01) | |
| *C09K 8/584* | (2006.01) | |
| *C09K 8/60* | (2006.01) | |
| *C09K 8/74* | (2006.01) | |
| *C23G 1/06* | (2006.01) | |
| *C23G 1/08* | (2006.01) | |

(52) U.S. Cl.
CPC ................ *C23F 11/04* (2013.01); *C09K 8/52* (2013.01); *C09K 8/54* (2013.01); *C09K 8/584* (2013.01); *C09K 8/602* (2013.01); *C09K 8/74* (2013.01); *C23G 1/06* (2013.01); *C23G 1/08* (2013.01); *C09K 2208/32* (2013.01)

(58) Field of Classification Search
CPC .. C23F 11/04; C09K 8/52; C09K 8/54; C09K 8/584; C09K 8/602; C09K 8/74; C09K 2208/32; C23G 1/06; C23G 1/08
See application file for complete search history.

(56) References Cited

U.S. PATENT DOCUMENTS

| | | | | |
|---|---|---|---|---|
| 3,658,720 A * | 4/1972 | Looney et al. | ......... | C23F 11/04 252/396 |
| 11,319,479 B2 * | 5/2022 | Purdy | .................... | C09K 8/528 |
| 11,591,696 B2 * | 2/2023 | Purdy | .................... | C23F 11/04 |
| 2006/0264335 A1 * | 11/2006 | Penna | .................... | C23F 11/10 507/244 |
| 2007/0010404 A1 * | 1/2007 | Welton | .................... | C23F 11/10 507/267 |

\* cited by examiner

*Primary Examiner* — Haidung D Nguyen
(74) *Attorney, Agent, or Firm* — Sheridan Ross P.C.

(57) ABSTRACT

An inhibition corrosion package for use with an acidic composition, where the package comprises a terpene component; a propargyl alcohol or derivative thereof, at least one amphoteric surfactant; and a solvent. Also disclosed are acidic compositions combining the corrosion inhibition package according to a preferred embodiment of the present invention for use in various industrial operations including but not limited to oil and gas operations. Also disclosed are methods of use of such compositions.

14 Claims, No Drawings

CORROSION INHIBITION PACKAGE

CROSS-REFERENCE TO RELATED APPLICATIONS

This application is a continuation of U.S. patent application Ser. No. 16/465,665, filed May 31, 2019, which is a national stage application under 35 U.S.C. 371 and claims the benefit of PCT Application No. PCT/CA2017/000256 having an international filing date of 30 Nov. 2017, which designated the United States, which PCT application claimed the benefit of Canada Patent Application No. 2,950,370 filed 2 Dec. 2016, the disclosure of each of which are incorporated herein by reference.

FIELD OF THE INVENTION

This invention relates to corrosion inhibition packages for use with acidic compositions, more specifically to corrosion inhibition packages for use with acidic composition wherein said package comprises a terpene component and at least one amphoteric surfactant.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive.

Acidizing is a type of stimulation treatment which is performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks or to treat scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating flow of hydrocarbons to the wellbore. While matrix acidizing is done at a low enough pressure to keep from fracturing the reservoir rock, fracture acidizing involves pumping highly pressurized acid into the well, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas industry from using hydrochloric acid include the following: extremely high levels of corrosion (which is countered by the addition of 'filming' type corrosion inhibitors that are typically themselves toxic and harmful to humans, the environment and equipment) reactions between acids and various types of metals can vary greatly but softer metals, such as aluminum and magnesium, are very susceptible to major effects causing immediate damage. Hydrochloric acid produces Hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent environmental effects (organic sterility, poisoning of wildlife etc.) of acids in the event of an unintended or accidental release on surface or downhole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas cloud to be released, potentially endangering human and animal health. This is a common event at large storage sites when tanks split or leak. Typically if near the public, large areas need to be evacuated post event and a comprehensive, expensive to implement, emergency evacuation plan need to be in place prior to approval of such storage areas. Because of its acidic nature, hydrogen chloride gas is also corrosive, particularly in the presence of moisture.

The inability for acids and blends of such to biodegrade naturally without neutralizing the soil results in expensive cleanup-reclamation costs for the operator should an unintended release occur. Moreover, the toxic fumes produced by mineral & some organic acids are harmful to humans/animals and are highly corrosive and/or produce potentially explosive vapours. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation.

Another concern is the potential for exposure incidents on locations due to high corrosion levels of acids causing storage container failures and/or deployment equipment failures i.e. coiled tubing or fracturing iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Extremely high corrosion and reaction rates with temperature increase causes conventional acids to "spend/react or become neutral" prior to achieving its desired effect such as deeply penetrating an oil or gas formation to increase the wormhole or etched "pathway" effectively to allow the petroleum product to flow freely to the wellbore. As an example, hydrochloric acid can be utilized in an attempt to free stuck drill pipe in some situations. Prior to getting to the required depth to dissolve the formation that has caused the pipe/tubing to become stuck many acids spend or neutralize due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars. Conventional acids are also very destructive to most elastomers found in the oil & gas industry such as those found in blow out preventers (BOP's)/downhole tools/packers/submersible pumps/seals etc. Having to deal with spent acid during the back flush process is also very expensive as these acids typically are still at a low pH and remain toxic. It is advantageous to have an acid blend that can be exported to production facilities through pipelines that, once spent or applied, is much higher than that of spent HCl, reducing disposal costs/fees.

Acids perform many actions in the oil & gas industry and are considered necessary to achieve the desired production of various petroleum wells, maintain their respective systems and aid in certain drilling operational functions (i.e. freeing stuck pipe, filter cake treatments). The associated dangers that come with using mineral acids are expansive and tasking to mitigate through controls whether they are chemically or mechanically engineered Eliminating or even simply reducing the negative effects of acids while maintaining their usefulness is a struggle for the industry. As the public demand for the use of cleaner/safer/greener products increases, companies are looking for alternatives that perform the required function without all or most of the drawbacks associated with the use of conventional acids.

Several operations in the oil industry expose fluids to very high temperatures (some upward of 220° C./392° F.), the compositions used in these various operations need to withstand high temperatures without losing their overall effectiveness. These compositions must also be capable of being applied in operations over a wide range of temperatures while not or at least minimally affecting or corroding the equipment with which it comes in contact in comparison to a conventional mineral acid.

Offshore oil and gas operations are highly regulated due to the environmental concerns which arise from their operations and the potential for spills. The complexity of drilling and completing offshore wells is compounded by both safety issues for workers on such offshore oil rigs and production platforms as well as environmental concerns.

Many countries bordering the waters where offshore drilling and production is routinely carried out have put into play a number of regulations aimed at minimizing the environmental impact of this practice. These regulations include the ban on certain types of chemicals which may be harmful to marine life and the environment. In order to overcome these very restrictive regulations, many oil companies employ very costly containment programs for the handling of certain chemicals such as acids which have a wide array of uses in the industry of oil and gas exploration and production.

Many of the issues related with offshore oil and gas exploration and production stem from the fact that the conditions under which this is carried out are substantially different than those encountered in the same types of operations carried out onshore.

Acidic compositions conventionally used in various oil and gas operations can reach temperatures of up to 220° C. At these temperatures, their reactivity is exponentially increased and, as such, their effectiveness or even their ability to be utilized is greatly decreased. Corrosion is the major concern at high temperatures and is difficult and expensive to control with additional chemistry.

Modified and synthetic acids developed and currently patented are aimed at increasing personnel safety, reducing corrosion effects, reducing environmental damage, retarding the reaction rate and reducing the toxicity profile of HCl. However, it has been found that at temperatures above 90° C. the urea component in a synthetic or modified acid containing such compound tends to ultimately decompose to ammonia and carbon dioxide. The ammonia component will neutralize the acidic component or HCl and render the product non-reactive or neutral. Additionally, there is the risk of wellbore and/or formation damage due to uncontrolled solubilized mineral precipitation due to an increase in the pH caused mainly by the formation of ammonia during the decomposition phase. The advent of newer synthetic or modified acids is intended on providing usage at higher temperatures while still maintaining the performance, safety and environmental advantages and benefits of a urea-HCL modified or synthetic acid system. However, ultimately at these higher temperatures it is most often necessary to utilize additional or purpose developed corrosion inhibition packages and/or components to control corrosion of exposed steel. In that respect, even short exposure times at high temperature are more damaging to steel than longer exposure times at lower temperatures. In keeping with the changing times, there is also a strong desire to develop corrosion packages which are more "environmentally friendly and more effective" than conventional packages.

EP patent application 1 724 375 A2 discloses an aqueous organic acid composition containing a terpene as corrosion inhibitor intensifier said to be especially suitable for use in acidizing subterranean formations and wellbores. The composition is said to substantially reduce the corrosive effects of the acidic solution on metals in contact with the acidic solution. Suitable terpenes are said to include carotene, limonene, pinene, farnesene, camphor, cymene and menthol.

U.S. Pat. No. 8,765,021 teaches an aqueous treatment composition for inhibiting corrosion and acid attack on metallic surfaces that comprises a thiourea organic derivative, a polyalkoxylated terpene nonionic surfactant and an acid. The invention also relates to a process for cleaning industrial metallic equipment, in particular heat exchangers in which a heat transfer fluid, generally based on air or on water, flows, with a view to cleaning them and removing scale and other soiling.

US patent application no. 2003/0166472 discloses a well treatment microemulsion that is formed by combining a solvent-surfactant blend with a carrier fluid. In preferred embodiments, the solvent-surfactant blend includes a surfactant and a solvent selected from the group consisting of terpenes and alkyl or aryl esters of short chain alcohols. The disclosed well treatment microemulsion can be used in well remediation, stimulation and hydrogen sulfide mitigation operations.

U.S. Pat. No. 8,323,417 teaches a method of treatment for inhibiting sulfur-based corrosion or scaling or for removing scaling from a surface including inhibiting corrosion caused by sulfur-containing materials, reducing corrosion caused by sulfur-containing materials, inhibiting scaling caused by sulfur-containing materials in gas, liquid or solid phase or any combination of multiple phases of materials, reducing scaling caused by sulfur-containing materials, and removing scaling caused by sulfur-containing materials. The method involves contacting sulfur-containing materials with a composition containing a turpentine liquid, wherein said turpentine liquid comprises α-terpineol, β-terpineol, β-pinene, and p-cymene.

US patent application no. 2006/0264335 A1 discloses an aqueous organic acid composition containing a terpene as corrosion inhibitor intensifier is especially suitable for use in acidizing subterranean formations and wellbores. The composition substantially reduces the corrosive effects of the acidic solution on metals in contact with the acidic solution. Suitable terpenes are said to include carotene, limonene, pinene, farnesene, camphor, cymene and menthol.

U.S. Pat. No. 5,674,823 discloses novel derivatives of terpene origin which consist of cycloalkenyls or cycloalkyls having at least seven carbon atoms and possessing surfactant and/or fragrant properties. According to one embodiment, the invention relates to compounds of characteristic formula I in which p and q are integers or decimal numbers and are not equal to zero, O<P<20, preferably, O<P<5, and O<q<100, preferably 1<q<20. It is stated that the invention has particular applicability in detergent and perfume formulations.

Despite the various known corrosion inhibition packages, there is still a need for corrosion inhibition packages for use with modified and synthetic acid compositions in the oil industry which can be used over a range of applications, that are specifically formulated for synthetic and modified acid systems and can be used at ultra-high temperatures (i.e. 220° C.) without having its components degrade, phase out of solution and have a superior safety and environmental profile over known packages during use at those ultra-high temperatures. Moreover, it is desirable to have corrosion inhibition packages that do not undermine the advantages of environmentally and personnel-friendly acid compositions such as various synthetic and modified acid compositions which have fewer deleterious effects than typical conventional mineral and some organic acids. Some advantages of so-called environmentally friendly acid compositions include:

It was unexpectedly discovered that the corrosion inhibition packages according to the present invention exhibit stability when combined with acidic compositions under exposure to elevated temperature (above 150° C. and even up to at least 220° C.). This consequently makes them useful in various industries using acids at these temperatures including, but not limited to, the oil and gas industry.

SUMMARY OF THE INVENTION

According to a first aspect of the present invention, there is provided a corrosion inhibition package for use with an aqueous acid composition, said package comprising:

a terpene;

a propargyl alcohol or derivative thereof;

at least one amphoteric surfactant; and a solvent.

Preferably, the terpene is selected from the group consisting of: citral; ionone; ocimene; and cymene.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant is selected from the group consisting of: an amido betaine comprising a hydrophobic tail from C8 to C16. Most preferably, the amido betaine comprising a hydrophobic tail from C8 to C16 is cocamidobetaine.

Preferably also, the corrosion inhibition package further comprises an anionic surfactant. Preferably, the anionic surfactant is a carboxylic surfactant or a sulfonic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate When the anionic surfactant is a sulfonic surfactant, it is preferably a disulfonic surfactant, such as a surfactant from the DOWFAX® class of surfactant from DOW Chemicals.

Preferably, the surfactant is selected from the group consisting of: cocamidopropyl betaine; β-Alanine, N-(2-carboxyethyl)-N-dodecyl-, sodium salt (1:1); and a combination thereof.

Preferably, the solvent is selected from the group consisting of: methanol; ethanol; isopropanol; ethylene glycol; Di-n-hexyl-ether; and 2-Butoxyethanol; and combinations thereof.

Preferably, the terpene is present in an amount ranging from 2% to 25% by weight of the total weight of the corrosion inhibition package. Preferably also, the propargyl alcohol or derivative thereof is present in an amount ranging from 20% to 55% by volume of the total weight of the corrosion inhibition package. Preferably also, the at least one surfactant is present in an amount ranging from 2% to 20% by volume of the total weight of the corrosion inhibition package. Preferably also, the solvent is present in an amount ranging from 10% to 45% by volume of the total weight of the corrosion inhibition package.

According to another aspect of the present invention, there is provided an acidic composition comprising:
an acid;
a corrosion package comprising:
a terpene;
a propargyl alcohol or derivative thereof;
at least one surfactant; and
a solvent;
wherein the volume % of the corrosion package in the acidic composition ranges from 0.1 to 10%. Preferably, the acidic composition further comprises an intensifier selector from the group consisting of: metal iodides, metal iodates and formic acid.

Preferably the weight/volume % of the metal iodide or iodate in the acidic composition ranges from 0.1 to 1.5%. More preferably, the wt/vol. % of the metal iodide or iodate in the acidic composition ranges from 0.25 to 1.25%. Even more preferably, the wt/vol. % of the metal iodide or iodate in the acidic composition is approximately 1%. Preferably, the metal iodide or iodate selected from the group consisting of: cuprous iodide; potassium iodide; sodium iodide; lithium iodide and combinations thereof. More preferably, the metal iodide is potassium iodide.

According to one aspect of the present invention, there is provided an acidic composition comprising a corrosion inhibition package according to the invention and an acid selected from the group consisting of: mineral acids; organic acids, synthetic acids; and combinations thereof. More preferably, the acid is selected from the group consisting of: HCl, Lysine-HCl, Urea-HCl, hydrofluoric acid, sulfuric acid, phosphoric acid, p-toluene sulfonic acid. Even more preferably, the acid is lysine-HCl.

According to a preferred embodiment of the present invention, there is provided an aqueous synthetic acid composition for use in onshore oil and gas operations, said composition comprising: lysine and hydrochloric acid in a molar ratio of not less than 1:12; a surfactant; a corrosion inhibitor; and an intensifier.

According to a preferred embodiment of the present invention, there is provided an aqueous synthetic acid composition for use in offshore oil and gas operations, said composition comprising: lysine and hydrochloric acid in a molar ratio of not less than 1:12; a corrosion inhibitor; and an intensifier.

According to a preferred embodiment of the present invention, the corrosion inhibition package is used with an acidic composition such as a modified acid composition comprising:
a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

The use of a corrosion inhibitor package with an acidic composition where the acidic composition comprises an acid selected from the group consisting of: a mineral acid; an organic acid or a synthetic acid, said corrosion inhibitor package comprising:
a terpene;
a propargyl alcohol or derivative thereof;
at least one amphoteric surfactant; and
a solvent.

According to another aspect of the present invention, there is provided a use of a synthetic or modified acid composition comprising a preferred embodiment of the present invention in the oil and gas industry to perform an activity selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations, nozzles, ports, jets etc.; solubilizing limestone, dolomite, and calcite; and removing undesirable scale from the group consisting of: equipment, cyclical steam wells, steam flood wells, SAGD (steam assisted gravity drainage) wells, unassisted or natural high formation temperature production wells, injection wells and their related surface and down-hole equipment and facilities at high temperatures up to 220° C.

According to another aspect of the present invention, there is provided a synthetic or modified acid composition comprising a corrosion inhibition package according to a preferred embodiment for use in the oil and gas industry which has high salinity tolerance. A tolerance for high salinity fluids, or brines, is desirable for onshore and offshore acid applications. Conventional acids are normally blended with fresh water and additives, typically far offsite, and then transported to the area of treatment as a finished blend. It is advantageous to have an alternative that can be transported as a concentrate safely to the treatment area, then blended with a saline produced water or sea water. This greatly reduces logistics requirement. A conventional acid composition can precipitate salts/minerals heavily if blended with fluids of an excessive saline level resulting in formation plugging or ancillary damage, inhibiting production and substantially increasing costs. Brines are also typically present in formations, thus having an acidic composition system that has a high tolerance for brines greatly reduces the potential for formation damage or emulsions forming downhole during or after product placement/spending (reaction) occurs.

A preferred embodiment of the present invention provides a corrosion inhibition package which provides various oilfield grade steel alloys exceptional protection against corrosion when exposed to acidic compositions at low to ultra-high temperatures. Additionally, the components used in the preferred corrosion inhibition package are quite environmentally friendly.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the invention, there is provided a corrosion inhibition package for use with an acidic composition, said corrosion inhibition package comprising:
a terpene;
a propargyl alcohol or derivative thereof;
at least one amphoteric surfactant; and
a solvent.

Preferably, the corrosion inhibition package is used with an acidic composition such as a synthetic acid composition comprising:

lysine & hydrogen chloride in a molar ratio of not less than 1:12; preferably in a molar ratio not less than 1:8, more preferably in a molar ratio of not less than 1:5, even more preferably in a molar ratio of not less than 1:3 and even more preferably in a molar ratio of not less than 1:2.5.

Preferably, when the synthetic or modified acid composition comprises lysine and hydrogen chloride, the molar ratio of lysine to HCl can range from 1:2 to 1:12; preferably in a molar ratio ranging from 1:2.5 to 1:8, more preferably in a molar ratio ranging from 1:3 to 1:6, even more preferably in a molar ratio ranging from 1:3 to 1:5.

Also, preferably, the corrosion inhibition package is used with an acidic composition such as a modified acid composition comprising:

a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

In that respect, the composition comprises an alkanolamine and a strong acid, such as HCl, nitric acid, sulfuric acid, sulfonic acid. The alkanolamine according to the present invention contains at least one amino group, —$NH_2$, and one alcohol group, —OH. Preferred alkanolamines include, but are not limited to, monoethanolamine, diethanolamine and triethanolamine. More preferred are monoethanolamine, diethanolamine. Most preferred is monoethanolamine.

Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In the composition according to the present invention, it is preferred to use 2-Propyn-1-ol, complexed with methyloxirane, as this is a much safer derivative to handle. Basocorr® PP is an example of such a compound. In preferred embodiments of the present invention, 2-Propyn-1-ol, complexed with methyloxirane is present in an amount ranging from 20% to 55% by volume of the total volume of the corrosion inhibition package.

The terpenes considered by the inventors to achieve desirable corrosion inhibition results comprise: monoterpenes (acyclic); monocyclic terpenes; and beta-Ionone. Exemplary but non-limiting compounds of some of the previously listed terpene sub-classes comprise: for monoterpenes: citral (mixture of geranial and neral); citronellal; geraniol; and ocimene; for monocyclic terpenes: alpha-terpinene; carvone; p-cymene. More preferably, the terpenes are selected from the group consisting of: citral; ionone; ocimene; and cymene.

According to a preferred embodiment of the present invention, the corrosion inhibition package comprises a surfactant which is environmentally friendly. More preferably, the surfactant is capable of withstanding exposure to temperatures of up to least 220° C. for a duration of 2 to 4 hours in a closed environment without undergoing degradation.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate Most preferred are embodiments of a corrosion inhibition package comprising cocamidopropyl betaine and β-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide.

According to a preferred embodiment of the present invention, the corrosion package comprises: 2-Propyn-1-ol, compd. with methyloxirane; β-Alanine, N-(2-carboxyethyl)-N-dodecyl-, sodium salt (1:1); cocamidopropyl betaine; (±)-3,7-Dimethyl-2,6-octadienal (Citral); and isopropanol. More preferably, the composition comprises 38.5% of 2-Propyn-1-ol, compd. with methyloxirane; 5% of β-Alanine, N-(2-carboxyethyl)-N-dodecyl-, sodium salt (1:1); 5% of cocamidopropyl betaine; 20% of (±)-3,7-Dimethyl-2,6-octadienal (Citral); and 31.5% of Isopropanol (all percentages are volume percentages).

Example 1—Process to Prepare an Acidic Composition Comprising a Corrosion Inhibition Package According to a Preferred Embodiment of the Invention Lysine mono-hydrochloride is used as starting reagent. To obtain a 1:2 molar ratio of lysine to HCl, 370 ml of 50 wt % lysine-HCl solution and 200 ml HCl aq. 36% (22 Baume) were combined. The corrosion inhibition package, and potassium iodide (if required) are added at this point. Circulation is maintained until all products have been solubilized. Additional products can now be added as required.

The corrosion inhibition package is prepared by dispersing a terpene component in isopropanol, propargyl alcohol (preferably in the presence of methyloxirane) and two selected surfactants. Afterwards, the corrosion inhibition package thus prepared is mixed with an acidic composition. Applying this procedure, allows for the formation of a surfactant complex as described below.

According to a preferred embodiment of the present invention, since the corrosion inhibition package is intended for use at high temperatures, the combination of a betaine and a carboxylic surfactant is desirable. The combination of a carboxylic surfactant and a betaine is known to form a 1:1 or 1:2 complex, which has also a high molecular weight. Therefore, it is important to disperse the terpene component into isopropanol. Otherwise, the resulting acidic composition may not meet the class 1 fluid (transparent, no phase separation).

The resulting composition of Example 1 is an amber-colored liquid with a fermentation-like odour having an expected shelf-life of greater than a year. It has a freezing point temperature of approximately minus 45° C. and a boiling point temperature of approximately 100° C. It has a specific gravity of 1.15±0.02. It is completely soluble in water and its pH is less than 1.

The composition is biodegradable and is classified as a mild irritant according to the classifications for skin tests. The composition is substantially low fuming. Toxicity testing was calculated using surrogate information and the $LD_{50}$ was determined to be greater than 2000 mg/kg.

With respect to the corrosion impact of the acidic composition on typical oilfield grade steel alloys, it was established that it was clearly well below the acceptable corrosion limits set by industry making it highly desirable as corrosion is the main challenge during acid applications causing substantial maintenance and workover costs over time.

Corrosion Inhibition Package Formulations

Various types of steel alloy coupons were subjected to corrosion testing in the presence of synthetic and modified acid compositions using corrosion inhibitor components according to preferred embodiments of the present invention at various temperatures. The results of the corrosion tests are reported in Tables 9 through 26. The controls used were compositions of Lysine-HCl without corrosion inhibition additives or MEA-HCl without corrosion inhibitor additives. Coupons of various grades of steel alloys (indicated in each table) were exposed to the various listed compositions for various periods of time at varying temperatures. When the fluid system is diluted, it is so indicated in the table or title. For example, 50% indicates that the fluid system was diluted to half strength with tap water. Also, 50% seawater indicates that the fluid system was diluted to half strength with seawater (or an equivalent brine solution).

TABLE 1

List of Component and Content in Corrosion Inhibition Packages FCI-A to FCI-F

| Component | FCI-A | FCI-B | FCI-C | FCI-D | FCI-E | FCI-F |
|---|---|---|---|---|---|---|
| 2-Propyn-1-ol, compd. with methyloxirane | 34 | 38.5 | 38.5 | 38.5 | 34 | 45 |
| 4-Ethyloct-1-yn-3-ol | 4.5 | | | | 4.5 | |
| β-Alanine, N-(2-carboxyethyl)-N-dodecyl-, sodium salt (1:1) | 10 | 10 | 10 | 5 | 5 | 5 |
| Cocamidopropyl betaine | 10 | 10 | 10 | 5 | 5 | 5 |
| (±)-3,7-Dimethyl-2,6-octadienal (Citral) | 3 | 3 | 10 | 20 | 20 | 20 |
| Isopropanol | 38.5 | 38.5 | 31.5 | 31.5 | 31.5 | 25 |
| Total vol. % | 100 | 100 | 100 | 100 | 100 | 100 |

TABLE 2

List of Component and Content in Corrosion Inhibition Packages FCI-G to FCI-L

| Component | FCI-G | FCI-H | FCI-I | FCI-J | FCI-K | FCI-L |
|---|---|---|---|---|---|---|
| 2-Propyn-1-ol, compd. with methyloxirane | | 38.5 | 38.5 | 38.5 | 38.5 | 38.5 |
| β-Alanine, N-(2-carboxyethyl)-N-dodecyl-, sodium salt (1:1) | 5 | 5 | 5 | 5 | 5 | 5 |
| Cocamidopropyl betaine | 5 | 5 | 5 | 5 | 5 | 5 |
| (±)-3,7-Dimethyl-2,6-octadienal (Citral) | 20 | | | | | |
| 3,7-Dimethyl-1,3,6-octatrien (Ocymen) | | | | | 20 | |
| trans-3,7-Dimethyl-2,6-octadien-1-ol (Geraniol) | | | | | | 20 |
| p-Cymene | | | | 20 | | |
| 4-(2,6,6=Trimethyl-2-cyclohexenyl0-3-buten-2-one (β-Ionone) | | 20 | | | | |
| Isopropanol | 70 | 31.5 | 31.5 | 51.5 | 31.5 | 31.5 |
| Total vol. % | 100 | 100 | 100 | 100 | 100 | 100 |

TABLE 3

List of Components and Content in Corrosion Inhibition Packages FCI-M to FCI-R

| Component | FCI-M | FCI-N | FCI-O | FCI-P | FCI-Q | FCI-R |
|---|---|---|---|---|---|---|
| 2-Propyn-1-ol, compd. with methyloxirane | 38.5 | 38.5 | 38.5 | 38.5 | 38.5 | 38.5 |
| β-Alanine, N-(2-carboxyethyl)-N-dodecyl-, sodium salt (1:1) | 5 | 5 | 5 | 5 | 5 | 5 |
| Cocamidopropyl betaine | 5 | 5 | 5 | 5 | 5 | 5 |
| (±)-3,7-Dimethyl-2,6-octadienal (Citral) | | | | 20 | 20 | 20 |
| (±)-3,7-Dimethyl-6-octenal (Citronellal) | 20 | | | | | |
| p-Cymene | | | | | 10 | |
| 1-Isopropyl-4methyl)-1,3-cyclohaxadiene (a-Terpinene) | | 20 | | | | |
| 4-(2,6,6=Trimethyl-2-cyclohexenyl)-3-buten-2-one (β-Ionone) | | | | | | 10 |
| R-(-)-Carvone | | | 20 | | | |
| Isopropanol | 31.5 | 31.5 | 31.5 | 20 | 21.5 | 21.5 |
| Di-n-hexyl-ether | | | | 11.5 | | |
| Total vol. % | 100 | 100 | 100 | 100 | 100 | 100 |

20

TABLE 4

List of Component and Content in Corrosion Inhibition Packages FCI-S to FCI-V

| Component | FCI-S | FCI-T | FCI-U | FCI-V |
|---|---|---|---|---|
| 2-Propyn-1-ol, compd. with methyloxirane | 38.5 | 38.5 | 38.5 | 38.5 |
| β-Alanine, N-(2-carboxyethyl)-N-dodecyl-, sodium salt (1:1) | | | | 5 |
| Cocamidopropyl betaine | | | 5 | |
| (±)-3,7-Dimethyl-2,6-octadienal (Citral) | 20 | 20 | 20 | 20 |
| Isopropanol | 31.5 | 41.5 | 36.5 | 36.5 |
| Di-n-hexyl-ether | 10 | | | |
| Total vol. % | 100 | 100 | 100 | 100 |

TABLE 5

List of Components and Content in Corrosion Inhibition Packages FCI-B2 and FCI-B3

| Component | FCI-B2 | FCI-B3 | FCI-B2a | FCI-B2a (D) | FCI-B2a (DM) |
|---|---|---|---|---|---|
| 2-Propyn-1-ol, compd. with methyloxirane | 38.5 | 38.5 | 45 | 22.5 | 22.5 |
| β-Alanine, N-(2-carboxyethyl)-N-dodecyl-, sodium salt (1:1) | 10 | 10 | 11.7 | 5.85 | |
| Cocamidopropyl betaine | 10 | 10 | 11.7 | 5.85 | 5.85 |
| (±)-3,7-Dimethyl-2,6-octadienal (Citral) | 6 | 8 | 7 | 3.5 | 3.5 |
| Isopropanol | 35.5 | 33.5 | 24.6 | 42.3 | 48.15 |
| water | | | | 20 | 20 |
| Total vol. % | 100 | 100 | 100 | 100 | 100 |

TABLE 6

List of Components and Content in Corrosion Inhibition Packages FCI-D2 to FCI-D5

| Component | FCI-D2 | FCI-D3 | FCI-D4 | FCI-D5 |
|---|---|---|---|---|
| 2-Propyn-1-ol, compd. with methyloxirane | 38.5 | 38.5 | 38.5 | 38.5 |
| β-Alanine, N-(2-carboxyethyl)-N-dodecyl-, sodium salt (1:1) | 5 | 5 | 3 | 5 |

TABLE 6-continued

List of Components and Content in Corrosion Inhibition Packages FCI-D2 to FCI-D5

| Component | FCI-D2 | FCI-D3 | FCI-D4 | FCI-D5 |
|---|---|---|---|---|
| Cocamidopropyl betaine | 5 | 0 | 3 | 5 |
| 1-Dodecanaminium, N-(carboxymethyl)-N,N-dimethyl-, inner salt and 1-Tetradecanaminium, N-(carboxymethyl)-N,N-dimethyl-, inner salt | | 5 | | |
| (±)-3,7-Dimethyl-2,6-octadienal (Citral) | 20 | 20 | 20 | 15 |
| Isopropanol | 31.5 | 31.5 | 35.5 | 36.5 |
| Total vol. % | 100 | 100 | 100 | 100 |

TABLE 7

List of Components and Content in Corrosion Inhibition Packages FCI-D6 to FCI-D8

| Component | FCI-D6 | FCI-D7 | FCI-D8 |
|---|---|---|---|
| 2-Propyn-1-ol, compd. with methyloxirane | 38.5 | 38.5 | 38.5 |
| β-Alanine, N-(2-carboxyethyl)-N-dodecyl-, sodium salt (1:1) | 5 | 7.5 | 5 |
| Cocamidopropyl betaine | 5 | 7.5 | 5 |
| (±)-3,7-Dimethyl-2,6-octadienal (Citral) | 12.5 | 10 | 10 |
| Isopropanol | 39 | 36.5 | 41.5 |
| Total vol. % | 100 | 100 | 100 |

TABLE 8

List of Components and Content in Corrosion Inhibition Packages FCI-H2 and FCI-I2

| Compound | | FCI-H2 | FCI-I2 |
|---|---|---|---|
| 2-Propyn-1-ol, compd. with methyloxirane | Vol. % | 38.5 | 38.5 |
| β-Alanine, N-(2-carboxyethyl)-N-dodecyl-, sodium salt (1:1) | Vol. % | 10 | 10 |
| Cocamidopropyl betaine | Vol. % | 10 | 10 |
| p-Cymene | Vol. % | | 6 |
| β-Ionone | Vol. % | 6 | |
| Isopropanol | Vol. % | 35.5 | 35.5 |
| Total Vol. % | | 100 | 100 |

Corrosion Testing

The following corrosion testing outlined in the tables below for a number of different corrosion inhibition packages according to the present invention in the presence of a synthetic or modified acid composition was carried out diluted with saline water at a temperature of 150° C. (different temperatures were also used—these are indicated in the title of the tables where applicable) for an exposure period lasting 4 hour (some examples may have been carried out for shorter periods of time—these are also indicated in the title of the tables). A desirable result was one where the lb/ft² corrosion number is at or below 0.05. More preferably, that number is at or below 0.02. The acidic compositions also referred to as fluid or fluid systems, were also tested at various dilution ratios where 100% represents the undiluted fluid. All dilutions are done with tap water unless indicated otherwise.

TABLE 9

Corrosion test results from tests conducted on J55 steel at 150° C. for a period of 4 hours (coupon surface area of 28.922 cm², steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | NO CI | 37.7225 | 33.509 | 4.214 | 15980.92 | 405.915 | 0.299 |
| 50% Lysine HCl 1:3 + Seawater | NO CI | 37.7624 | 32.8383 | 4.924 | 18676.07 | 474.372 | 0.349 |

TABLE 9-continued

Corrosion test results from tests conducted on J55 steel at 150° C. for a period of 4 hours (coupon surface area of 28.922 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 15% HCl + Seawater | 5% FCI-D 5% CI-1A | 37.754 | 37.6589 | 0.095 | 360.6942 | 9.162 | 0.007 |
| 15% HCl + Seawater | 5% FCI-D | 38.7642 | 38.6659 | 0.098 | 372.8311 | 9.470 | 0.007 |
| 15% HCl + Seawater | 5% FCI-D | 37.3469 | 37.2079 | 0.139 | 527.1976 | 13.391 | 0.010 |
| 50% Lysine HCl 1:3 + Seawater | 2.5% FCI-D2 5% CI-1A | 36.7223 | 36.5178 | 0.204 | 775.6253 | 19.701 | 0.014 |
| 50% Lysine HCl 1:3 + Seawater | 5% FCI-D2 5% CI-1A | 37.5027 | 37.3713 | 0.131 | 498.3725 | 12.659 | 0.009 |
| 50% Lysine HCl 1:3 + Seawater | 2.5% FCI-D3 5% CI-1A | 37.6682 | 37.4969 | 0.171 | 649.7047 | 16.502 | 0.012 |
| 50% Lysine HCl 1:3 + Seawater | 5% FCI-D3 5% CI-1A | 37.7761 | 37.6005 | 0.176 | 666.0137 | 16.917 | 0.012 |

TABLE 10

Corrosion test results from tests conducted at 150° C. for 4 hours with a coupon density of 7.86 g/cc having a surface area of 28.922 cm$^2$ (steel coupons used were L80 coupons (used))

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 2.5% FCI-D 0.5% CI-1A | 37.01 | 36.8973 | 0.113 | 440.3054 | 11.184 | 0.008 |
| 50% Lysine HCl 1:3 + Seawater | 5% FCI-D 0.5% CI-1A | 35.7874 | 35.705 | 0.082 | 321.9269 | 8.177 | 0.006 |
| 50% Lysine HCl 1:3 + Seawater | 2.5% FCI-E 0.5% CI-1A | 37.5576 | 37.4583 | 0.099 | 387.9532 | 9.854 | 0.007 |
| 50% Lysine HCl 1:3 + Seawater | 5% FCI-E 0.5% CI-1A | 36.2755 | 36.2139 | 0.062 | 240.6638 | 6.113 | 0.004 |
| 50% Lysine HCl 1:3 + Seawater | 2.5% FCI-F 0.5% CI-1A | 37.7066 | 37.4858 | 0.221 | 862.6391 | 21.911 | 0.016 |
| 50% Lysine HCl 1:3 + Seawater | 5% FCI-F 0.5% CI-1A | 36.3462 | 36.1924 | 0.154 | 600.8782 | 15.262 | 0.011 |
| 50% Lysine HCl 1:3 + Seawater | 2.5% FCI-A 0.5% CI-1A | 36.8962 | 36.8499 | 0.046 | 180.8886 | 4.595 | 0.003 |
| 50% Lysine HCl 1:3 + Seawater | 5% FCI-A 0.5% CI-1A | 35.7048 | 35.6665 | 0.038 | 149.6335 | 3.801 | 0.003 |
| 50% Lysine HCl 1:3 + Seawater | 2.5% FCI-B 0.5% CI-1A | 37.459 | 37.3766 | 0.082 | 321.9269 | 8.177 | 0.006 |
| 50% Lysine HCl 1:3 + Seawater | 0.5% CI-1A | 36.2136 | 36.1546 | 0.059 | 230.5059 | 5.855 | 0.004 |
| 50% Lysine HCl 1:3 + Seawater | 2.5% FCI-C 0.5% CI-1A | 37.4864 | 37.2176 | 0.269 | 1050.169 | 26.674 | 0.020 |
| 50% Lysine HCl 1:3 + Seawater | 5% FCI-G 0.5% CI-1A | 36.1917 | 33.338 | 2.854 | 11149.06 | 283.186 | 0.208 |

CI-1A: Potassium iodide

TABLE 11

Corrosion test results from tests conducted at 150° C. for 4 hours with a coupon density of 7.86 g/cc having a surface area of 28.922 cm$^2$ (steel coupons used were J55 coupons)

| Fluid | Corrosion Package | Initial Wt. (g) | Final wt. (g) | Loss wt. (g) | Mils/yr | mm/year | lb/ft2 | Notes |
|---|---|---|---|---|---|---|---|---|
| 50% Lysine HCl 1:3 + Seawater | 5% FCI-A 0.5% CI-1A | 37.0119 | 36.8451 | 0.167 | 632.6372 | 16.069 | 0.012 | |
| 50% Lysine HCl 1:3 + Seawater | 5% FCI-B 0.5% CI-1A | 37.7643 | 37.6085 | 0.156 | 590.9165 | 15.009 | 0.011 | |
| 50% Lysine HCl 1:3 + Seawater | 5% FCI-C 0.5% CI-1A | 36.1695 | 35.9993 | 0.170 | 645.5327 | 16.397 | 0.012 | |
| 50% Lysine HCl 1:3 + Seawater | 5% FCI-D 0.5% CI-1A | 37.5864 | 37.4001 | 0.186 | 706.5966 | 17.948 | 0.013 | |
| 50% Lysine HCl 1:3 + Seawater | 5% FCI-E 0.5% CI-1A | 38.0712 | 37.6173 | 0.454 | 1721.547 | 43.727 | 0.032 | 2 |
| 50% Lysine HCl 1:3 + Seawater | 5% FCI-F 0.5% CI-1A | 37.1952 | 36.9591 | 0.236 | 895.4774 | 22.745 | 0.017 | |
| 50% Lysine HCl 1:3 + Seawater | 2.5% FCI-B 0.5% CI-1A | 36.8453 | 36.6665 | 0.179 | 678.1506 | 17.225 | 0.013 | |
| 50% Lysine HCl 1:3 + Seawater | 2.5% FCI-D 0.5% CI-1A | 35.9995 | 35.8433 | 0.156 | 592.4336 | 15.048 | 0.011 | |
| 50% Lysine HCl 1:3 + Seawater | 5% FCI-H 0.5% CI-1A | 37.6098 | 37.274 | 0.336 | 1273.618 | 32.350 | 0.024 | 2 |
| 50% Lysine HCl 1:3 + Seawater | 5% FCI-J 0.5% CI-1A | 37.4009 | 36.9432 | 0.458 | 1735.959 | 44.093 | 0.032 | 2 |
| 50% Lysine HCl 1:3 + Seawater | 2.5% FCI-I 0.5% CI-1A | 38.0037 | 37.5763 | 0.427 | 1621.038 | 41.174 | 0.030 | |
| 50% Lysine HCl 1:3 + Seawater | 2.5% FCI-K 0.5% CI-1A | 35.8436 | 35.5226 | 0.321 | 1217.485 | 30.924 | 0.023 | |
| 50% Lysine HCl 1:3 + Seawater | 2.5% FCI-L 0.5% CI-1A | 38.0771 | 37.5798 | 0.497 | 1886.154 | 47.908 | 0.035 | |
| 50% Lysine HCl 1:3 + Seawater | 2.5% FCI-M 0.5% CI-1A | 37.5469 | 36.9798 | 0.567 | 2150.891 | 54.633 | 0.040 | |
| 50% Lysine HCl 1:3 + Seawater | 2.5% FCI-N 0.5% CI-1A | 36.9591 | 35.7608 | 1.198 | 4544.899 | 115.440 | 0.085 | |
| 50% Lysine HCl 1:3 + Seawater | 2.5% FCI-O 0.5% CI-1A | 37.1169 | 36.0159 | 1.101 | 4175.86 | 106.067 | 0.078 | |
| 50% Lysine HCl 1:3 + Seawater | 2.5% FCI-D 0.2% CI-1A | 38.031 | 37.678 | 0.353 | 1338.854 | 34.007 | 0.025 | 2 |
| 50% Lysine HCl 1:3 + Seawater | 2.5% FCI-D 0.4% CI-1A | 37.6167 | 37.1985 | 0.418 | 1586.144 | 40.288 | 0.030 | 2 |
| 50% Lysine HCl 1:3 + Seawater | 1.5% FCI-D 0.5% CI-1A | 37.5349 | 36.8591 | 0.676 | 2563.167 | 65.104 | 0.048 | 2 |
| 50% Lysine HCl 1:3 + Seawater | 1.5% FCI-D 0.4% CI-1A | 37.3754 | 36.6932 | 0.682 | 2587.441 | 65.721 | 0.048 | 2 |

NB: 1-light pitting; 2-pitting; 3-severe pitting

TABLE 12

Corrosion test results from tests conducted at 150° C. for 4 hours with a coupon density 7.86 g/cc having a surface area of 28.922 cm$^2$ (steel coupons used were L80 coupons)

| Fluid | Corrosion Package | Initial Wt. (g) | Final wt. (g) | Loss wt. (g) | Mils/yr | mm/year | lb/ft2 | Notes |
|---|---|---|---|---|---|---|---|---|
| 50% Lysine HCl 1:3 + Seawater | 2.5% FCI-D 0.5% CI-1A | 58.5911 | 56.895 | 1.696 | 6626.46 | 168.312 | 0.124 | 3 |
| 50% Lysine HCl 1:3 + Seawater | 3.5% FCI-D 0.5% CI-1A | 58.0584 | 57.6962 | 0.362 | 1415.072 | 35.943 | 0.026 | 2 |
| 50% Lysine HCl 1:3 + Seawater | 5% FCI-D 0.5% CI-1A | 59.0373 | 58.7794 | 0.258 | 1007.584 | 25.593 | 0.019 | 1 |

NB: 1-light pitting; 2-pitting; 3-severe pitting

TABLE # 13

Corrosion test results from tests conducted at 150° C. for 4 hours with a coupon density of 7.86 g/cc having a surface area of 28.922 cm$^2$ (steel coupons used were P110 coupons)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 2.5% FCI-A 0.5% CI-A | 56.5631 | 55.3102 | 1.253 | 4751.985 | 120.700 | 0.091 |
| 50% Lysine HCl 1:3 + Seawater | 2.5% FCI-B 0.5%CI-1A | 58.2611 | 56.9186 | 1.343 | 5091.819 | 129.332 | 0.098 |
| 50% Lysine HCl 1:3 + Seawater | 2.5% FCI-C 0.5% CI-1A | 55.4101 | 54.4499 | 0.960 | 3641.836 | 92.503 | 0.070 |
| 50% Lysine HCl 1:3 + Seawater | 5% FCI-B 0.5% CI-1A | 54.6811 | 54.1685 | 0.513 | 1944.184 | 49.382 | 0.037 |
| 50% Lysine HCl 1:3 + Seawater | 5% FCI-D 0.5% CI-1A | 55.397 | 55.0747 | 0.322 | 1222.416 | 31.049 | 0.024 |

TABLE # 14

Corrosion test results from tests conducted at 150° C. for 4 hours with a coupon density of 7.86 g/cc having a surface area of 28.922 cm$^2$ (steel coupons used were J55 coupons)

| Fluid | Corrosion Package | Initial Wt. (g) | Final wt. (g) | Loss wt. (g) | Mils/yr | mm/year | lb/ft2 | Notes |
|---|---|---|---|---|---|---|---|---|
| 50% Lysine HCl 1:3 + Seawater | 2.5% FCI-Q 0.5% CI-1A | 37.1228 | 36.7597 | 0.363 | 1377.162 | 34.980 | 0.026 | 2 |
| 50% Lysine HCl 1:3 + Seawater | 2.5% FCI-R 0.5% CI-1A | 36.1937 | 35.4262 | 0.767 | 2910.965 | 73.939 | 0.054 | 2 |
| 50% Lysine HCl 1:3 + Seawater | 2.5% FCI-S 0.5% CI-1A | 37.0775 | 35.7491 | 1.328 | 5189.9 | 131.823 | 0.097 | |
| 50% Lysine HCl 1:3 + Seawater | 2.5% FCI-T 0.5% CI-1A | 38.7799 | 37.423 | 1.357 | 5301.246 | 134.652 | 0.099 | |
| 50% Lysine HCl 1:3 + Seawater | 2.5% FCI-U 0.5% CI-1A | 37.2187 | 35.7939 | 1.425 | 5403.966 | 137.261 | 0.101 | |
| 50% Lysine HCl 1:3 + Seawater | 2.5% FCI-V 0.5% CI-1A | 37.1923 | 36.4536 | 0.739 | 2801.733 | 71.164 | 0.052 | |

NB: 1 - light pitting; 2 - pitting; 3 - severe pitting

TABLE # 15

Corrosion test results from tests conducted on L80 steel at 200° C. for a period of 2 hours (coupon surface area of 28.0774 cm$^2$, steel density = 7.86 g/cc)

| Fluid | Corrosion Package | Initial Wt. (g) | Final wt. (g) | Loss wt. (g) | Mils/yr | mm/year | lb/ft2 | notes |
|---|---|---|---|---|---|---|---|---|
| 50% Lysine HCl 1:3 + Seawater | 5% FCI-D 0.5% CI-1A | 36.1585 | 35.7254 | 0.433 | 3384.14 | 85.957 | 0.032 | |
| 50% Lysine HCl 1:3 + Seawater | 5% FCI-D 0.75% CI-1A | 37.429 | 36.7473 | 0.682 | 5326.64 | 135.297 | 0.050 | |
| 50% Lysine HCl 1:3 + Seawater | 7.5% FCI-D 0.5% CI-1A | 37.2217 | 36.4711 | 0.751 | 5865.009 | 148.971 | 0.055 | |
| 50% Lysine HCl 1:3 + Seawater | 7.5% FCI-D 0.75% CI-1A | 37.3811 | 36.7824 | 0.599 | 4678.098 | 118.824 | 0.044 | |
| 50% Lysine HCl 1:3 + Seawater | 7.5% FCI-D 1% CI-1A | 35.6699 | 35.0103 | 0.660 | 5153.956 | 130.910 | 0.048 | |
| 50% Lysine HCl 1:3 + Seawater | 7.5% FCI-A 1% CI-1A | 60.1359 | 59.7917 | 0.344 | 2689.496 | 68.313 | 0.025 | |
| 50% Lysine HCl 1:3 + Seawater | 7.5% FCI-D 1% CI-1A | 58.7 | 58.3834 | 0.317 | 2473.837 | 62.835 | 0.023 | |
| 50% Lysine HCl 1:3 + Seawater | 7.5% FCI-E 1% CI-1A | 57.8853 | 56.755 | 1.130 | 8831.893 | 224.330 | 0.083 | severe pitting |
| 50% Lysine HCl 1:3 + Seawater | 7.5% FCI-I 1% CI-1A | 58.5468 | 58.1361 | 0.411 | 3209.111 | 81.511 | 0.030 | small pits |
| 50% Lysine HCl 1:3 + Seawater | 7.5% FCI-X 1% CI-1A | 58.7183 | 56.3012 | 2.417 | 18886.64 | 479.721 | 0.176 | severe pitting |
| 50% Lysine HCl 1:3 + Seawater | 10% FCI-A 1% CI-1A | 58.6233 | 57.7126 | 0.911 | 7115.992 | 180.746 | 0.066 | Pitting |
| 50% Lysine HCl 1:3 + Seawater | 10% FCI-D 1% CI-1A | 59.3942 | 59.027 | 0.367 | 2869.213 | 72.878 | 0.027 | slight pitting |
| 50% Lysine HCl 1:3 + Seawater | 7.5% FCI-Y 1% CI-1A | 58.9283 | 58.6014 | 0.327 | 2554.318 | 64.880 | 0.024 | Pitting |
| 50% Lysine HCl 1:3 + Seawater | 7.5% FCI-Z 1% CI-1A | 58.7227 | 58.2307 | 0.492 | 3844.37 | 97.647 | 0.036 | Pitting |

TABLE # 16

Corrosion test results from tests conducted on L80 Steel at 150° C. for a period of 4 hours (coupon surface area of 28.0774 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 5% FCI-B 0.5% CI-1A | 60.9646 | 60.4796 | 0.485 | 1894.837 | 48.129 | 0.035 |
| 50% Lysine HCl 1:3 + Seawater | 5% FCI-B2 0.5% CI-1A | 60.7783 | 60.5228 | 0.256 | 998.2079 | 25.354 | 0.019 |
| 50% Lysine HCl 1:3 + Seawater | 5% FCI-C 0.5% CI-1A | 61.3428 | 60.9434 | 0.399 | 1560.408 | 39.634 | 0.029 |

TABLE # 17

Corrosion test results from tests conducted on P110 steel at 150° C. for a period of 4 hours (coupon surface area of 28.922 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 5% FCI-B 0.5% CI-1A | 55.797 | 55.0799 | 0.717 | 2719.809 | 69.083 | 0.052 |
| 50% Lysine HCl 1:3 + Seawater | 5% FCI-B2 0.5% CI-1A | 56.5985 | 55.3402 | 1.258 | 4772.466 | 121.221 | 0.092 |
| 50% Lysine HCl 1:3 + Seawater | 5% FCI-C 0.5% CI-1A | 55.5223 | 54.3893 | 1.133 | 4297.23 | 109.150 | 0.083 |

TABLE #18

Corrosion test results from tests conducted on L80 steel at 150° C. for a period of 4 hours (coupon surface area of 28.0774 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 5% FCI-A 0.5% CI-1A | 60.8837 | 60.5081 | 0.376 | 1467.424 | 37.273 | 0.027 |
| 50% Lysine HCl 1:3 + Seawater | 5% FCI-B 0.5% CI-1A | 59.4286 | 59.1164 | 0.312 | 1219.728 | 30.981 | 0.023 |
| 50% Lysine HCl 1:3 + Seawater | 5% FCI-B2 0.5% CI-1A | 60.7783 | 60.5228 | 0.256 | 998.2079 | 25.354 | 0.019 |
| 50% Lysine HCl 1:3 + Seawater | 5% FCI-B3 0.5% CI-1A | 60.869 | 60.6118 | 0.257 | 1004.85 | 25.523 | 0.019 |
| 50% Lysine HCl 1:3 + Seawater | 5% FCI-C 0.5% CI-1A | 61.794 | 61.5172 | 0.277 | 1081.424 | 27.468 | 0.020 |

TABLE #19

Corrosion test results from tests conducted on L80 steel at 200° C. for a period of 2 hours (coupon surface area of 28.0774 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:3 + Seawater | 7.5% FCI-B2 1% CI-1A | 60.9673 | 60.4881 | 0.479 | 3744.354 | 95.107 | 0.035 |
| 50% Lysine HCl 1:3 + Seawater | 10% FCI-B2 1% CI-1A | 60.4192 | 59.9616 | 0.458 | 3575.577 | 90.820 | 0.033 |
| 50% Lysine HCl 1:3 + Seawater | 10% FCI-B2 1.25% CI-1A | 60.2292 | 59.6716 | 0.558 | 4356.953 | 110.667 | 0.041 |
| 50% Lysine HCl 1:3 + Seawater | 7.5% FCI-B2 0.75% CI-1A | 60.4591 | 60.0077 | 0.451 | 3527.131 | 89.589 | 0.033 |
| 50% Lysine HCl 1:3 + Seawater | 7.5% FCI-B2 1% CI-1A | 60.6992 | 60.4063 | 0.293 | 2288.65 | 58.132 | 0.021 |

TABLE #20

Corrosion test results from tests conducted on L80 steel at 150° C. for a period of 4 hours (coupon surface area of 28.0774 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine HCl 1:5 + Seawater | 5% FCI-B2 0.5% CI-1A | 60.4177 | 60.1643 | 0.253 | 990.0034 | 25.146 | 0.018 |
| 50% Lysine HCl 1:5 + Seawater | 7.5% FCI-B2 0.5% CI-1A | 59.6982 | 59.4745 | 0.224 | 873.9691 | 22.199 | 0.016 |
| 50% Lysine HCl 1:5 + Seawater | 5% FCI-B2 0.75% CI-1A | 59.899 | 59.6007 | 0.298 | 1165.422 | 29.602 | 0.022 |
| 50% Lysine HCl 1:5 + Seawater | 7.5% FCI-B2 0.75% CI-1A | 60.3211 | 60.0907 | 0.230 | 900.1452 | 22.864 | 0.017 |

TABLE #21

Corrosion test results from tests conducted on L80 steel at 220° C. for a period of 2 hours (coupon surface area of 28.0774 cm$^2$, steel density of 7.86 g/cc)

| Fluid | Corrosion Package | Initial Wt. (g) | Final wt. (g) | Loss wt. (g) | Mils/yr | mm/year | lb/ft2 |
|---|---|---|---|---|---|---|---|
| 50% Lysine-HCl 1:3 + Seawater | 7.5% FCI-B2 1% CI-1A | 61.6074 | 61.1883 | 0.419 | 3274.747 | 83.179 | 0.031 |
| 50% Lysine-HCl 1:3 + Seawater | 7.5% FCI-H2 1% CI-1A | 61.3002 | 60.6069 | 0.693 | 5417.28 | 137.599 | 0.051 |
| 50% Lysine-HCl 1:3 + Seawater | 7.5% FCI-12 1% CI-1A | 59.1065 | 58.2406 | 0.866 | 6765.935 | 171.855 | 0.063 |

TABLE #22

Corrosion test results from tests conducted using 15% HCl on 1018 steel at various temperatures for a period of 6 hours (coupon surface area of 41.4 cm$^2$, steel density of 7.86 g/cc)

| Temp | Corrosion Package | Initial Wt. (g) | Final wt. (g) | Loss wt. (g) | Mils/yr | mm/year | lb/ft2 |
|---|---|---|---|---|---|---|---|
| 70 | 0.5% FCI-B2a 0.25% CI-1A | 74.0445 | 74.0042 | 0.040 | 71.18695714 | 1.808 | 0.002 |
| 70 | 0.25% FCI-B2a 0.25% CI-1A | 74.2268 | 74.1473 | 0.079 | 140.430846 | 3.567 | 0.004 |
| 70 | 0.15% FCI-B2a 0.25% CI-1A | 74.0014 | 73.8027 | 0.199 | 350.9887936 | 8.915 | 0.010 |
| 70 | 0.5% FCI-B2a | 74.079 | 74.0257 | 0.053 | 94.1504917 | 2.391 | 0.003 |
| 70 | 0.25% FCI-B2a | 74.0705 | 73.9506 | 0.120 | 211.7944457 | 5.380 | 0.006 |
| 70 | 0.15% FCI-B2a | 73.9286 | 73.5075 | 0.421 | 743.8418772 | 18.894 | 0.021 |
| 90 | 0.5% FCI-B2a 0.25% CI-1A | 74.2865 | 74.1327 | 0.154 | 271.6762781 | 6.901 | 0.008 |
| 90 | 0.25% FCI-B2a 0.25% CI-1A | 74.1226 | 73.3237 | 0.799 | 1411.19752 | 35.844 | 0.040 |
| 90 | 0.5% FCI-B2a | 74.0325 | 73.8418 | 0.191 | 336.8573877 | 8.556 | 0.009 |
| 90 | 0.25% FCI-B2a | 73.8154 | 72.9728 | 0.843 | 1488.390325 | 37.805 | 0.042 |
| 50 | 0.25% FCI-B2a 0.25% CI-1A | 75.0438 | 75.0165 | 0.027 | 48.22342258 | 1.225 | 0.001 |
| 50 | 0.25% FCI-B2a | 75.054 | 75.0109 | 0.043 | 76.1329492 | 1.934 | 0.002 |
| 50 | 0.15% FCI-B2a 0.15% CI-1A | 74.177 | 74.1309 | 0.046 | 81.4322264 | 2.068 | 0.002 |
| 50 | 0.15% FCI-B2a | 74.0119 | 73.9414 | 0.070 | 124.5330143 | 3.163 | 0.003 |
| 110 | 1.0% FCI-B2a 0.25% CI-1A | 74.0053 | 73.9371 | 0.068 | 120.4702352 | 3.060 | 0.003 |
| 110 | 0.75% FCI-B2a 0.25% CI-1A | 74.1822 | 74.1141 | 0.068 | 120.2935926 | 3.055 | 0.003 |

TABLE #22-continued

Corrosion test results from tests conducted using 15% HCl on 1018 steel at various temperatures for a period of 6 hours (coupon surface area of 41.4 cm$^2$, steel density of 7.86 g/cc)

| Temp | Corrosion Package | Initial Wt. (g) | Final wt. (g) | Loss wt. (g) | Mils/yr | mm/year | lb/ft2 |
|---|---|---|---|---|---|---|---|
| 110 | 1.0% FCI-B2a | 74.1918 | 74.091 | 0.101 | 178.0557141 | 4.523 | 0.005 |
| 110 | 0.75% FCI-B2a | 74.238 | 74.1362 | 0.102 | 179.8221399 | 4.567 | 0.005 |
| 110 | 0.50% FCI-B2a 0.25% CI-1A | 73.942 | 73.8467 | 0.095 | 168.3403726 | 4.276 | 0.005 |
| 110 | 0.50% FCI-B2a | 74.1361 | 73.9157 | 0.220 | 389.3202321 | 9.889 | 0.011 |
| 70 | 0.25% FCI-B2a(D) 0.25% CI-1A | 74.2088 | 73.6566 | 0.552 | 975.4202911 | 24.776 | 0.027 |
| 70 | 0.50% FCI-B2a(D) 0.25% CI-1A | 74.9309 | 74.838 | 0.093 | 164.1009508 | 4.168 | 0.005 |
| 70 | 0.75% FCI-B2a (D) 0.25% CI-1A | 74.1802 | 74.1116 | 0.069 | 121.1768054 | 3.078 | 0.003 |
| 70 | 0.25% FCI-B2a (D) | 74.1369 | 73.9055 | 0.231 | 408.7509152 | 10.382 | 0.011 |
| 70 | 0.50% FCI-B2a (D) | 73.9657 | 73.9016 | 0.064 | 113.2278896 | 2.876 | 0.003 |
| 70 | 0.75% FCI-B2a (D) | 74.1934 | 74.1485 | 0.045 | 79.31251552 | 2.015 | 0.002 |
| 90 | 0.50% FCI-B2a (D) 0.25% CI-1A | 74.2141 | 73.7547 | 0.459 | 811.4959828 | 20.612 | 0.023 |
| 90 | 0.75% FCI-B2a (D) 0.25% CI-1A | 74.0777 | 73.9459 | 0.132 | 232.8149119 | 5.913 | 0.007 |
| 90 | 1.0% FCI-B2a (D) 0.25% CI-1A | 74.1802 | 74.1116 | 0.069 | 121.1768054 | 3.078 | 0.003 |
| 90 | 0.50% FCI-B2a (D) | 73.9886 | 73.2281 | 0.761 | 1343.366772 | 34.122 | 0.038 |
| 90 | 0.75% FCI-B2a (D) | 74.2525 | 73.9589 | 0.294 | 518.6225959 | 13.173 | 0.015 |
| 90 | 1.0% FCI-B2a (D) | 74.0419 | 73.8995 | 0.142 | 251.5390247 | 6.389 | 0.007 |
| 90 | 0.75% FCI-B2a (D) 0.25% CI-1A | 74.0619 | 73.6747 | 0.387 | 683.9600447 | 17.373 | 0.019 |
| 90 | 1.0% FCI-B2a (D) 0.25% CI-1A | 74.0166 | 73.8356 | 0.181 | 319.7230581 | 8.121 | 0.009 |
| 50 | 0.25% FCI-B2a (D) 0.25% CI-1A | 74.078 | 74.032 | 0.046 | 81.25558383 | 2.064 | 0.002 |
| 50 | 0.50% FCI-B2a (D) 0.25% CI-1A | 74.1016 | 74.0735 | 0.028 | 49.63656316 | 1.261 | 0.001 |
| 50 | 0.75% FCI-B2a (D) 0.25% CI-1A | 73.9875 | 73.9654 | 0.022 | 39.03800875 | 0.992 | 0.001 |
| 50 | 0.25% FCI-B2a(D) | 74.1088 | 74.0327 | 0.076 | 134.4249985 | 3.414 | 0.004 |
| 50 | 0.50% FCI-B2a(D) | 74.0231 | 73.9881 | 0.035 | 61.82490074 | 1.570 | 0.002 |
| 50 | 0.75% FCI-B2a(D) | 74.181 | 74.1539 | 0.027 | 47.87013743 | 1.216 | 0.001 |
| 110 | 0.50% FCI-B2a 0.25% CI-1A | 74.1478 | 74.0243 | 0.124 | 218.1535783 | 5.541 | 0.006 |
| 110 | 0.75% FCI-B2a 0.25% CI-1A | 74.0935 | 74.0018 | 0.092 | 161.9812399 | 4.114 | 0.005 |
| 110 | 0.75% FCI-B2a 0.50% CI-1A | 74.5447 | 74.4628 | 0.082 | 144.6702677 | 3.675 | 0.004 |
| 130 | 0.75% FCI-B2a 0.25% CI-1A | 74.0073 | 73.6322 | 0.375 | 662.5862933 | 16.830 | 0.019 |
| 130 | 0.75% FCI-B2a 0.50% CI-1A | 74.0998 | 73.7496 | 0.350 | 618.6022925 | 15.712 | 0.017 |

TABLE #23

Corrosion test results from tests conducted using 15% HCl on 1018 steel at various temperatures for a period of 4 hours (coupon surface area of 41.4 cm$^2$, steel density of 7.86 g/cc)

| Temp ° C. | Corrosion Package | Initial Wt. (g) | Final wt. (g) | Loss wt. (g) | Mils/yr | mm/year | lb/ft2 |
|---|---|---|---|---|---|---|---|
| 150 | 1.75% FCI-2a 0.750% CI-1A | 74.147 | 73.7916 | 0.355 | 941.6815595 | 23.919 | 0.018 |
| 150 | 2.25% FCI-2a 0.75% CI-1A | 74.0795 | 73.5693 | 0.510 | 1351.845615 | 34.337 | 0.025 |
| 150 | 2.5% FCI-2a 1.25% CI-1A | 74.0907 | 73.6619 | 0.429 | 1136.165033 | 28.859 | 0.021 |
| 90 | 1.0% FCI-B2a(DM) 0.25% CI-1A | 74.2756 | 73.6124 | 0.663 | 1757.240322 | 44.634 | 0.033 |
| 90 | 0.75% FCI-B2a(DM) 0.25% CI-1A | 74.2299 | 73.63 | 0.600 | 1589.518198 | 40.374 | 0.030 |
| 70 | 1.0% FCI-B2a (DM) | 74.0194 | 73.8533 | 0.166 | 440.104972 | 11.179 | 0.008 |
| 70 | 0.75% FCI-B2a(DM) | 74.2191 | 73.9308 | 0.288 | 763.8908093 | 19.403 | 0.014 |
| 70 | 0.35% FCI-B2a(DM) 0.25% CI-1A | 74.0978 | 73.7705 | 0.327 | 867.2267148 | 22.028 | 0.016 |

TABLE #23-continued

Corrosion test results from tests conducted using 15% HCl on 1018 steel at various temperatures for a period of 4 hours (coupon surface area of 41.4 cm$^2$, steel density of 7.86 g/cc)

| Temp °C. | Corrosion Package | Initial Wt. (g) | Final wt. (g) | Loss wt. (g) | Mils/yr | mm/year | lb/ft2 |
|---|---|---|---|---|---|---|---|
| 70 | 0.50% FCI-B2a(DM) 0.25% CI-1A | 74.1442 | 73.9403 | 0.204 | 540.2613112 | 13.723 | 0.010 |
| 70 | 0.75% FCI-B2a(DM) 0.25% CI-1A | 74.1127 | 73.9854 | 0.127 | 337.2989942 | 8.567 | 0.006 |
| 90 | 1.0% FCI-B2a(DM) 0.50% CI-1A | 74.0561 | 73.7182 | 0.338 | 895.312884 | 22.741 | 0.017 |

TABLE #24

Corrosion test results from tests conducted using various synthetic acid blends on L80 steel at various temperatures and exposure times (coupon surface area of 28.0774.29 cm$^2$, steel density of 7.86 g/cc)

| Fluid system | temp | Corrosion Package | Initial Wt. (g) | Final wt. (g) | Loss wt. (g) | Time (hours) | Mils/yr | mm/year | lb/ft2 |
|---|---|---|---|---|---|---|---|---|---|
| 50% lysine-HCl 1:4.5 | 200 | 7.5% FCI-B2a 1% CI-1A | 60.4438 | 60.135 | 0.309 | 2 | 2412.889212 | 61.287 | 0.023 |
| 90% lysine-HCl 1:4.5 | 110 | 1.25% FCI-B2a 1% CI-1A | 60.6304 | 60.4759 | 0.154 | 6 | 402.4086607 | 10.221 | 0.011 |
| 90% lysine-HCl 1:4.5 | 110 | 1.25% FCI-B2a 1% CI-1A | 61.1477 | 60.8601 | 0.288 | 6 | 749.079164 | 19.027 | 0.021 |
| 50% lysine-HCl 1:4.5 | 200 | 7.5% FCI-B2a 1% CI-1A | 59.129 | 58.7474 | 0.382 | 2 | 2981.73097 | 75.736 | 0.028 |
| 50% lysine-HCl 1:6.5 | 200 | 8.5% FCI-B2a 1.25% CI-1A | 60.8457 | 60.4712 | 0.374 | 2 | 2926.253271 | 74.327 | 0.027 |
| 50% lysine-HCl 1:8.5 | 150 | 5.0% FCI-B2a 0.5% CI-1A | 60.5557 | 60.3627 | 0.193 | 4 | 754.0278789 | 19.152 | 0.014 |
| 50% lysine-HCl 1:8.5 | 150 | 5.0% FCI-B2a 0.5% CI-1A | 60.1053 | 59.5843 | 0.521 | 5 | 1628.387668 | 41.361 | 0.038 |
| 50% lysine-HCl 1:8.5 | 150 | 5.0% FCI-B2a 0.5% CI-1A | 60.0322 | 59.3632 | 0.669 | 6 | 1742.46857 | 44.259 | 0.049 |
| 33% lysine-HCl 1:8.5 | 150 | 5.0% FCI-B2a 0.5% CI-1A | 60.3761 | 60.1877 | 0.188 | 4 | 736.05623 | 18.696 | 0.014 |
| 33% lysine-HCl 1:8.5 | 150 | 5.0% FCI-B2a 0.5% CI-1A | 60.3221 | 59.9849 | 0.337 | 5 | 1053.920003 | 26.770 | 0.025 |
| 33% lysine-HCl 1:8.5 | 150 | 5.0% FCI-B2a 0.5% CI-1A | 60.2575 | 59.6801 | 0.577 | 6 | 1503.888419 | 38.199 | 0.042 |
| 33% lysine-HCl 1:8.5 | 150 | 6.0% FCI-B2a 0.6% CI-1A | 60.2718 | 60.0777 | 0.194 | 4 | 758.3254471 | 19.261 | 0.014 |
| 33% lysine-HCl 1:8.5 | 150 | 6.0% FCI-B2a 0.6% CI-1A | 60.1422 | 59.8309 | 0.311 | 5 | 972.9694454 | 24.713 | 0.023 |
| 33% lysine-HCl 1:8.5 | 150 | 6.0% FCI-B2a 0.6% CI-1A | 59.863 | 59.3958 | 0.467 | 6 | 1216.862953 | 30.908 | 0.034 |
| 100% lysine-HCl 1:8.5 | 150 | 3.0% FCI-B2a 0.3% CI-1A | 60.4234 | 59.2116 | 1.212 | 4 | 4734.357428 | 120.253 | 0.088 |
| 100% lysine-HCl 1:8.5 | 150 | 2.5% FCI-B2a 0.3% CI-1A | 60.4212 | 59.7891 | 0.632 | 4 | 2469.538975 | 62.726 | 0.046 |
| 50% lysine-HCl 1:8.5 | 150 | 5.0% FCI-B2a 0.5% CI-1A | 60.667 | 60.3115 | 0.355 | 4 | 1388.895912 | 35.278 | 0.026 |
| 50% lysine-HCl 1:8.5 | 150 | 5.0% FCI-B2a 0.5% CI-1A | 60.667 | 60.3115 | 0.355 | 4 | 1388.895912 | 35.278 | 0.026 |
| 100% lysine-HCl 1:8.5 | 150 | 6.0% FCI-B2a 0.7% CI-1A | 60.4182 | 59.778 | 0.640 | 4 | 2501.184705 | 63.530 | 0.047 |
| 6.66% lysine-HCl 1:8.5 | 150 | 5.0% FCI-B2a 0.5% CI-1A | 60.4667 | 59.9199 | 0.547 | 3 | 2848.376126 | 72.349 | 0.040 |
| 13.3% lysine-HCl 1:8.5 | 150 | 5.0% FCI-B2a 0.5% CI-1A | 60.6686 | 60.5198 | 0.149 | 3 | 775.125032 | 19.688 | 0.011 |
| 13.3% lysine-HCl 1:8.5 | 150 | 5.0% FCI-B2a 0.5% CI-1A | 59.7332 | 59.4264 | 0.307 | 4 | 1198.630846 | 30.445 | 0.022 |
| 6.66% lysine-HCl 1:8.5 | 150 | 6.5% FCI-2A 0.65% CI-1A | 60.3516 | 60.1867 | 0.165 | 3 | 858.992727 | 21.818 | 0.012 |

TABLE #25

Corrosion test results from tests conducted using various synthetic acid blends on QT-800 steel coupons at 200° C. for an exposure time of 2 hours (surface area of 34.31 cm$^2$ and steel density of 7.86 g/cm$^3$)

| Fluid system | Corrosion Package | Initial Wt. (g) | Final wt. (g) | Loss (g) | Mils/yr | mm/year | lb/ft2 |
|---|---|---|---|---|---|---|---|
| 50% lysine-HCl 1:4.5 | 5.5% FCI-B2a 1% CI-1A | 40.9424 | 40.728 | 0.214 | 1370.948189 | 34.822 | 0.013 |
| 50% lysine-HCl 1:6.5 | 5.5% FCI-B2a 1% CI-1A | 40.6582 | 40.2635 | 0.395 | 2523.849115 | 64.106 | 0.024 |
| 50% lysine-HCl 1:6.5 | 7.5% FCI-B2a 1% CI-1A | 41.2752 | 40.9446 | 0.331 | 2113.971415 | 53.695 | 0.020 |
| 50% lysine-HCl 1:6.5 | 8.5% FCI-B2a 1% CI-1A | 41.011 | 40.4755 | 0.536 | 3424.173299 | 86.974 | 0.032 |
| 50% lysine-HCl 1:6.5 | 8.5% FCI-B2a 1.25% CI-1A | 40.9879 | 40.5325 | 0.455 | 2911.986032 | 73.964 | 0.027 |
| 50% lysine-HCl 1:6.5 | 8.5% FCI-B2a 1% CI-1A | 40.6423 | 40.1602 | 0.482 | 3082.715121 | 78.301 | 0.029 |
| 50% lysine-HCl 1:4.5 | 7.5% FCI-B2a 1% CI-1A | 40.8089 | 40.4582 | 0.351 | 2242.497807 | 56.959 | 0.021 |
| 66% lysine-HCl 1:4.5 | 7.5% FCI-B2a 1% CI-1A | 40.5471 | 40.2666 | 0.281 | 1793.614585 | 45.558 | 0.017 |
| 66% lysine-HCl 1:6.5 | 5.5% FCI-B2a 1% CI-1A | 40.3666 | 38.9679 | 1.399 | 8943.774403 | 227.172 | 0.084 |
| 66% lysine-HCl 1:6.5 | 7.5% FCI-B2a 1% CI-1A | 40.9341 | 39.7116 | 1.223 | 7817.090304 | 198.554 | 0.073 |
| 50% lysine-HCl 1:6.5 | 7.5% FCI-B2a 1% CI-1A | 41.1124 | 40.7353 | 0.377 | 2411.308592 | 61.247 | 0.023 |
| 66% lysine-HCl 1:6.5 | 7.5% FCI-B2a 1% CI-1A | 41.0294 | 40.406 | 0.623 | 3986.236479 | 101.250 | 0.037 |
| 66% lysine-HCl 1:6.5 | 7.5% FCI-B2a 1% CI-1A | 40.5272 | 39.8122 | 0.715 | 4571.958746 | 116.128 | 0.043 |
| 66% lysine-HCl 1:6.5 | 8.5% FCI-B2a 1.25% CI-1A | 40.5157 | 40.1242 | 0.392 | 2503.387202 | 63.586 | 0.023 |
| 50% lysine-HCl 1:6.5 | 5% FCI-B2a 0.5% CI-1A | 40.4454 | 40.2591 | 0.186 | 595.6335066 | 15.129 | 0.011 |
| 33% lysine-HCl 1:6.5 | 5% FCI-B2a 0.5% CI-1A | 40.435 | 40.2035 | 0.232 | 740.145769 | 18.800 | 0.014 |

TABLE #26

Corrosion test results from tests conducted using various synthetic acid blends on various steel coupons at various temperature and exposure times

| Steel | Fluid | T (° C.) | Corrosion inhibitor | Surface area | density | time | Mills/yr | Mm/year | Lb/ft$^2$ |
|---|---|---|---|---|---|---|---|---|---|
| L80 | 50% MEA 1:3.5 | 130 | 2.0% FCI-B2a 2.5% CI-1A | 28.0774 | 7.86 | 6 | 504.248 | 12.808 | 0.014 |
| L80 | 50% MEA 1:3.5 | 130 | 3.0% FCI-B2a 2.5% CI-1A | 28.0774 | 7.86 | 6 | 718.345 | 18.246 | 0.020 |
| L80 | 50% MEA 1:3.5 | 150 | 2.0% FCI-B2a 2.5% CI-1A | 28.0774 | 7.86 | 4 | 950.543 | 24.144 | 0.018 |
| L80 | 50% MEA 1:3.5 | 150 | 3.0% FCI-B2a 2.5% CI-1A | 28.0774 | 7.86 | 4 | 903.661 | 22.953 | 0.017 |
| L80 | 50% MEA 1:3.5 | 200 | 7.5% FCI-B2a 1.0% CI-1A | 28.0774 | 7.86 | 2 | 2775.44 | 70.496 | 0.026 |
| L80 | 50% MEA 1:3.5 | 110 | 1.75% FCI-B2a 1% CI-1A | 28.0774 | 7.86 | 6 | 200.0322 | 5.081 | 0.006 |
| N80 | 50% MEA 1:3.5 | 110 | 1.75% FCI-B2a 1% CI-1A | 28.0774 | 7.86 | 6 | 281.555 | 7.152 | 0.008 |
| L80 | 50% DEA 1:3.5 | 110 | 1.75% FCI-B2a 1% CI-1A | 28.0774 | 7.86 | 4 | 651.667 | 16.552 | 0.012 |
| N80 | 50% DEA 1:3.5 | 110 | 1.75% FCI-B2a 1% CI-1A | 28.0774 | 7.86 | 4 | 414.519 | 10.529 | 0.008 |
| 1018 | 50% MEA 1:3.5 | 90 | 0.75% FCI-B2a 0.25% CI-1A | 41.4 | 7.86 | 6 | 170.106 | 4.321 | 0.005 |
| 1018 | 50% DEA 1:3.5 | 90 | 0.75% FCI-B2a 0.25% CI-1A | 41.4 | 7.86 | 6 | 152.795 | 3.881 | 0.004 |
| 1018 | 50% MEA 1:3.5 | 90 | | 41.4 | 7.86 | 6 | 14686.06 | 373.026 | 0.411 |
| 1018 | 50% MEA 1:3.5 | 90 | 0.25% FCI-B2a 0.15% CI-1A | 41.4 | 7.86 | 6 | 1092.88 | 27.759 | 0.031 |
| 1018 | 50% MEA 1:3.5 | 90 | 0.50% FCI-B2a 0.15% CI-1A | 41.4 | 7.86 | 6 | 696.148 | 17.682 | 0.019 |
| 1018 | 50% MEA 1:5.5 | 90 | | 41.4 | 7.86 | 6 | 21341.77 | 542.081 | 0.598 |

TABLE #26-continued

Corrosion test results from tests conducted using various synthetic acid blends on various steel coupons at various temperature and exposure times

| Steel | Fluid | T (° C.) | Corrosion inhibitor | Surface area | density | time | Mills/yr | Mm/year | Lb/ft² |
|---|---|---|---|---|---|---|---|---|---|
| 1018 | 50% MEA 1:5.5 | 90 | 0.25% FCI- B2a 0.15% CI-1A | 41.4 | 7.86 | 6 | 4080.44 | 103.643 | 0.114 |
| 1018 | 50% MEA 1:5.5 | 90 | 0.50% FCI- B2a 0.15% CI-1A | 41.4 | 7.86 | 6 | 789.23 | 20.047 | 0.022 |
| 1018 | 50% MEA 1:8.5 | 90 | | 41.4 | 7.86 | 6 | 26288.12 | 667.718 | 0.736 |
| 1018 | 50% MEA 1:8.5 | 90 | 0.25% FCI- B2a 0.15% CI-1A | 41.4 | 7.86 | 6 | 6798.266 | 172.676 | 0.190 |
| 1018 | 50% MEA 1:8.5 | 90 | 0.50% FCI- B2a 0.15% CI-1A | 41.4 | 7.86 | 6 | 1415.260 | 35.948 | 0.040 |
| L80 | 50% MEA 1:3.5 | 120 | 0.75% FCI- B2a 0.50% CI-1A | 28.0774 | 7.86 | 6 | 765.227 | 19.437 | 0.021 |
| L80 | 50% MEA 1:3.5 | 120 | 1.0% FCI- B2a 0.75% CI-1A | 28.0774 | 7.86 | 6 | 858.732 | 21.812 | 0.024 |
| 1018 | 50% MEA 1:3.5 | 90 | 0.60% FCI- B2a 0.25% CI-1A | 41.4 | 7.86 | 6 | 392.853 | 9.978 | 0.011 |
| 1018 | 50% MEA 1:3.5 | 90 | 0.50% FCI- B2a 0.25% CI-1A | 41.4 | 7.86 | 6 | 515.972 | 13.106 | 0.014 |
| 1018 | 50% MEA 1:5.5 | 90 | 0.60% FCI- B2a 0.25% CI-1A | 41.4 | 7.86 | 6 | 345.512 | 8.776 | 0.010 |
| 1018 | 50% MEA 1:5.5 | 90 | 0.50% FCI- B2a 0.25% CI-1A | 41.4 | 7.86 | 6 | 615.069 | 15.623 | 0.017 |
| 1018 | 50% MEA 1:8.5 | 90 | 0.60% FCI- B2a 0.25% CI-1A | 41.4 | 7.86 | 6 | 1032.484 | 26.225 | 0.029 |
| 1018 | 50% MEA 1:8.5 | 90 | 0.50% FCI- B2a 0.25% CI-1A | 41.4 | 7.86 | 6 | 1027.353 | 26.095 | 0.029 |
| N80 | 50% MEA 1:3.5 | 90 | 0.6% FCI- B2a 0.25% CI-1A | 28.0774 | 7.86 | 6 | 240.403 | 6.106 | 0.007 |
| J55 | 50% MEA 1:3.5 | 90 | 0.6% FCI- B2a 0.25% CI-1A | 28.922 | 7.86 | 6 | 138.310 | 3.513 | 0.004 |
| P110 | 50% MEA 1:3.5 | 90 | 0.6% FCI- B2a 0.25% CI-1A | 28.922 | 7.86 | 4 | 364.487 | 9.258 | 0.007 |
| QT900 | 50% MEA 1:3.5 | 90 | 0.6% FCI- B2a 0.25% CI-1A | 34.31 | 7.86 | 6 | 93.783 | 2.382 | 0.003 |
| N80 | 50% MEA 1:3.5 | 110 | 0.75% FCI- B2a 0.50% CI-1A | 28.0774 | 7.86 | 6 | 396.418 | 10.069 | 0.011 |
| J55 | 50% MEA 1:3.5 | 110 | 0.75% FCI- B2a 0.50% CI-1A | 28.922 | 7.86 | 6 | 144.631 | 3.674 | 0.004 |
| P110 | 50% MEA 1:3.5 | 110 | 0.75% FCI- B2a 0.50% CI-1A | 28.922 | 7.86 | 4 | 701.286 | 17.813 | 0.013 |
| QT900 | 50% MEA 1:3.5 | 110 | 0.75% FCI- B2a 0.50% CI-1A | 34.31 | 7.86 | 6 | 339.966 | 8.635 | 0.010 |
| 1018 | 50% MEA 1:3.5 | 110 | 0.75% FCI- B2a 0.50% CI-1A | 33.22 | 7.86 | 6 | 313.917 | 7.974 | 0.009 |
| L80 | 33% MEA 1:3.5 | 90 | 0.6% FCI- B2a 0.25% CI-1A 0.1% NE-1 | 28.0774 | 7.86 | 6 | 278.169 | 7.066 | 0.008 |
| L80 | 33% MEA 1:3.5 | 120 | 0.75% FCI- B2a 0.5% CI-1A 0.1% NE-1 | 28.0774 | 7.86 | 6 | 798.566 | 20.284 | 0.022 |
| P110 | 33% MEA 1:3.5 | 120 | 0.925% FCI-B2a 0.625% CI-1A 0.1% NE-1 | 28.922 | 7.86 | 6 | 1398.52 | 35.523 | 0.040 |
| P110 | 33% MEA 1:3.5 | 120 | 1.25% FCI- B2a 0.95% CI-1A 0.1% NE-1 | 28.922 | 7.86 | 6 | 834.160 | 21.188 | 0.024 |
| P110 | 50% MEA 1:5.5 | 90 | 1% FCI- B2a 1% CI-1A | 28.922 | 7.86 | 72 | 66.6477 | 1.693 | 0.023 |
| P110 | 50% MEA 1:5.5 | 90 | 2% FCI- B2a 2% CI-1A | 28.922 | 7.86 | 72 | 36.832 | 0.936 | 0.013 |
| P110 | 50% MEA 1:5.5 | 90 | 3% FCI- B2a 3% CI-1A | 28.922 | 7.86 | 72 | 34.956 | 0.888 | 0.012 |
| P110 | 50% MEA 1:5.5 | 90 | 2% FCI- B2a 2% CI-1A | 28.922 | 7.86 | 168 | 38.0633 | 0.967 | 0.031 |
| P110 | 50% MEA 1:5.5 | 90 | 3% FCI- B2a 3% CI-1A | 28.922 | 7.86 | 168 | 33.4307 | 0.849 | 0.027 |
| N80 | 50% MEA 1:3.5 | 60 | 0.25% FCI- B2a | 28.0774 | 7.86 | 6 | 123.196 | 3.129 | 0.003 |
| J55 | 50% MEA 1:3.5 | 60 | 0.25% FCI- B2a | 28.922 | 7.86 | 6 | 79.901 | 2.029 | 0.002 |
| 1018 | 50% MEA 1:3.5 | 60 | 0.25% FCI-B2a | 33.22 | 7.86 | 6 | 431.471 | 10.959 | 0.012 |
| J55 | 50% MEA 1:3.5 | 130 | 1.75% FCI- B2a 1.25% CI-1A | 28.922 | 7.86 | 6 | 515.313 | 13.089 | 0.014 |

TABLE #26-continued

Corrosion test results from tests conducted using various synthetic acid blends on various steel coupons at various temperature and exposure times

| Steel | Fluid | T (° C.) | Corrosion inhibitor | Surface area | density | time | Mills/yr | Mm/year | Lb/ft² |
|---|---|---|---|---|---|---|---|---|---|
| 1018 | 50% MEA 1:3.5 | 130 | 1.75% FCI- B2a 1.25% CI-1A | 33.22 | 7.86 | 6 | 1371.683 | 34.841 | 0.038 |
| N80 | 50% MEA 1:3.5 | 130 | 2.25% FCI- B2a 1.75% CI-1A | 28.0774 | 7.86 | 6 | 1671.884 | 42.466 | 0.047 |
| 1018 | 50% MEA 1:3.5 | 130 | 2.25% FCI- B2a 1.75% CI-1A | 33.22 | 7.86 | 6 | 1289.351 | 32.750 | 0.036 |
| N80 | 50% MEA 1:3.5 | 150 | 2.25% FCI- B2a 2.25% CI-1A | 28.0774 | 7.86 | 4 | 1498.679 | 38.066 | 0.028 |
| N80 | 50% MEA 1:3.5 | 150 | 2.50% FCI- B2a 2.75% CI-1A | 28.0774 | 7.86 | 4 | 1058.373 | 26.883 | 0.020 |
| L80 1:3.5 | 50% MEA 1:3.5 | 150 | 2.0% FCI- B2a 2.5% CI-1A | 28.0774 | 7.86 | 4 | 752.465 | 19.113 | 0.014 |
| L80 | 50% MEA 1:3.5 | 150 | 2.5% FCI- B2a 2.5% CI-1A | 28.0774 | 7.86 | 4 | 553.604 | 14.062 | 0.010 |
| L80 | 50% MEA 1:3.5 | 170 | 7.5% FCI- B2a 7.5% CI-1A | 28.0774 | 7.86 | 3 | 2690.017 | 68.326 | 0.038 |
| L80 | 50% MEA 1:3.5 | 120 | 0.5% FCI- B2a 0.25% CI-1A | 28.0774 | 7.86 | 3 | 492.266 | 12.504 | 0.007 |
| L80 | 50% MEA 1:3.5 | 120 | 0.75% FCI- B2a 0.5% CI-1A | 28.0774 | 7.86 | 3 | 557.902 | 14.171 | 0.008 |
| L80 | 33% MEA 1:5.5 | 120 | 0.5% FCI- B2a 0.25% CI-1A | 28.0774 | 7.86 | 3 | 797.524 | 20.257 | 0.011 |
| L80 | 33% MEA 1:5.5 | 120 | 0.75% FCI- B2a 0.5% CI-1A | 28.0774 | 7.86 | 3 | 434.965 | 11.048 | 0.006 |
| L80 | 33% MEA 1:3.5 | 120 | 0.5% FCI- B2a 0.25% CI-1A | 28.0774 | 7.86 | 3 | 502.685 | 12.768 | 0.007 |
| L80 | 33% MEA 1:3.5 | 120 | 0.5% FCI- B2a 0.25% CI-1A | 28.0774 | 7.86 | 4 | 544.228 | 13.823 | 0.010 |
| L80 | 33% MEA 1:3.5 | 120 | 0.5% FCI- B2a 0.25% CI-1A | 28.0774 | 7.86 | 5 | 1210.820 | 30.755 | 0.028 |
| L80 | 50% MEA 1:3.5 | 120 | 0.5% FCI- B2a 0.25% CI-1A | 28.0774 | 7.86 | 4 | 566.497 | 14.389 | 0.011 |
| L80 | 50% MEA 1:3.5 | 120 | 0.5% FCI- B2a 0.25% CI-1A | 28.0774 | 7.86 | 5 | 984.533 | 25.007 | 0.023 |
| L80 | 50% MEA 1:3.5 | 90 | 1.5% FCI- B2a 1.5% CI-1A | 28.0774 | 7.86 | 72 | 59.4062 | 1.509 | 0.020 |
| P110 | 50% MEA 1:3.5 | 90 | 1.5% FCI- B2a 1.5% CI-1A | 28.922 | 7.86 | 72 | 41.6996 | 1.059 | 0.014 |
| P110 | 50% MEA 1:3.5 | 90 | 2.0% FCI- B2a 2.0% CI-1A | 28.922 | 7.86 | 72 | 38.855 | 0.987 | 0.013 |
| L80 | 50% MEA 1:5.5 | 90 | 0.5% FCI- B2a 0.25% CI-1A | 28.0774 | 7.86 | 6 | 278.690 | 7.079 | 0.008 |
| N80 | 50% MEA 1:5.5 | 90 | 0.5% FCI- B2a 0.25% CI-1A | 28.0774 | 7.86 | 6 | 175.028 | 4.446 | 0.005 |
| J55 | 50% MEA 1:5.5 | 90 | 0.5% FCI- B2a 0.25% CI-1A | 28.922 | 7.86 | 6 | 169.664 | 4.309 | 0.005 |
| P110 | 50% MEA 1:5.5 | 90 | 0.5% FCI- B2a 0.25% CI-1A | 28.922 | 7.86 | 6 | 214.418 | 5.446 | 0.006 |
| QT-900 | 50% MEA 1:5.5 | 90 | 0.5% FCI- B2a 0.25% CI-1A | 34.31 | 7.86 | 6 | 94.210 | 2.393 | 0.003 |
| 1018CS | 50% MEA 1:5.5 | 90 | 0.5% FCI- B2a 0.25% CI-1A | 33.22 | 7.86 | 6 | 1000.529 | 25.413 | 0.028 |
| L80 | 50% MEA 1:5.5 | 110 | 0.75% FCI- B2a 0.5% CI-1A | 28.0774 | 7.86 | 6 | 458.407 | 11.644 | 0.013 |
| N80 | 50% MEA 1:5.5 | 110 | 0.75% FCI- B2a 0.5% CI-1A | 28.0774 | 7.86 | 6 | 460.490 | 11.696 | 0.013 |
| J55 | 50% MEA 1:5.5 | 110 | 0.75% FCI- B2a 0.5% CI-1A | 28.922 | 7.86 | 6 | 147.665 | 3.751 | 0.004 |
| P110 | 50% MEA 1:5.5 | 110 | 0.75% FCI- B2a 0.5% CI-1A | 28.922 | 7.86 | 6 | 249.312 | 6.333 | 0.007 |
| QT-900 | 50% MEA 1:5.5 | 110 | 0.75% FCI- B2a 0.5% CI-1A | 34.31 | 7.86 | 6 | 165.400 | 4.201 | 0.005 |
| 1018CS | 50% MEA 1:5.5 | 110 | 0.75% FCI- B2a 0.5% CI-1A | 33.22 | 7.86 | 6 | 195.262 | 4.960 | 0.005 |

*NE represents an ethoxylate-based non-emulsifier

The results highlight the flexibility of the application of the CI package according to the present invention. Used in appropriate amounts given a specific metal, acidic fluid and temperature, corrosion packages according to preferred embodiments of the present invention can yield desirable corrosion protection.

Additionally, corrosion inhibition packages according to preferred embodiments of the present invention will allow the end user to utilize synthetic and modified acids that have the down-hole performance advantages, transportation and storage advantages as well as the health, safety and environmental advantages. The person skilled in the art will also understand that the corrosion package according to the present invention is useful when as also utilized with conventional acid systems.

In addition to stability at high temperatures and desirable corrosion rates as discussed above, the use of synthetic and modified acids along with a corrosion package according to a preferred embodiment of the present invention, allows for reduction in skin corrosiveness, a more controlled or methodical spending or reacting property, minimizing near well bore damage typically caused by an ultra-aggressive reaction with the formation typically caused by HCl and increasing formation penetration providing superior production over time.

Uses of Corrosion Inhibition Packages According to Preferred Embodiments of the Present Invention The uses (or applications) of the corrosion inhibition packages according to the present invention when combined (or mixed) with acidic compositions upon dilution of the latter ranging from approximately 1 to 90% dilution, include, but are not limited to: injection/disposal well treatments; matrix acid squeezes, soaks or bullheads; acid fracturing, acid washes; fracturing spearheads (breakdowns); pipeline scale treatments, cement breakdowns or perforation cleaning; pH control; and de-scaling applications. As would be understood by the person skilled in the art, the methods of use generally comprise the following steps: providing a composition comprising a corrosion inhibitor package according to a preferred embodiment of the present; mixing said package with an acid composition; exposing a surface (such as a metal surface) to the acid composition comprising the package; allowing the acid composition a sufficient period of time to act upon said surface; and optionally, removing the acid composition when the exposure time has been determined to be sufficient for the operation to be complete or sufficiently complete. Another method of use comprises: injecting the acid composition comprising the package into a well and allowing sufficient time for the acid composition to perform its desired function. Yet another method of use comprises: exposing the acid composition comprising the package to a body of fluid (typically water) requiring a decrease in the pH and allowing sufficient exposure time for the acid composition to lower the pH to the desired level.

One of the advantages of the use of a synthetic acid composition using a corrosion inhibition package according to a preferred embodiment of the present invention includes: the reduction of the total loads of acid, and the required number of tanks by delivering concentrated product to location and diluting with fluids available on location (with low to high salinity production water).

An acidic composition comprising a corrosion inhibition package according to a preferred embodiment of the present invention can be used to treat scale formation inside a ultra-high SAGD (steam assisted gravity drainage) well wherein the SAGD or cyclical steam operation is halted and said synthetic or modified acid is injected into said well to treat scale formation inside said well, wherein the treatment does not require a cool-down period between stopping the steam and the injection of the synthetic or modified acid composition.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A corrosion inhibition package for use with an aqueous acid composition, consisting of:
   a terpene;
   a propargyl alcohol or derivative thereof;
   at least one amphoteric surfactant;
   a solvent; and
   optionally, an anionic surfactant.

2. The corrosion inhibition package of claim 1, wherein the terpene is selected from the group consisting of:
   citral;
   ionone;
   ocimene; and
   cymene.

3. The corrosion inhibition package of claim 1, wherein the at least one amphoteric surfactant is selected from the group consisting of:
   a sultaine surfactant; a betaine surfactant; and combinations thereof.

4. The corrosion inhibition package of claim 1, wherein the at least one amphoteric surfactant is selected from the group consisting of:
   cocamidopropyl betaine;
   β-Alanine, N-(2-carboxyethyl)-N-dodecyl-, sodium salt (1:1); and
   a combination thereof.

5. The corrosion inhibition package of claim 1, wherein the solvent is selected from the group consisting of: isopropanol; methanol; ethanol; 2-butoxyethanol; diethylene glycol; Di-n-hexyl-ether; and combinations thereof.

6. The corrosion inhibition package of claim 1, wherein the terpene is present in an amount ranging from 2% to 25% by volume of the total volume of the corrosion inhibition package.

7. The corrosion inhibition package of claim 1, wherein the propargyl alcohol or derivative thereof is present in an amount ranging from 20% to 55% by volume of the total volume of the corrosion inhibition package.

8. The corrosion inhibition package of claim 1, wherein the at least one surfactant is present in an amount ranging from 2% to 20% by volume of the total volume of the corrosion inhibition package.

9. The corrosion inhibition package of claim 1, wherein the solvent is present in an amount ranging from 10% to 45% by volume of the total volume of the corrosion inhibition package.

10. An aqueous liquid acidic composition, comprising:
   an acidic solution; and
   a corrosion package, consisting of:
      a terpene;
      a propargyl alcohol or derivative thereof,
      an amphoteric surfactant;
      a solvent; and
      optionally, an intensifier,
   wherein the volume % of the corrosion package in the acidic composition ranges from 0.1 to 10%, C.

11. The composition of claim 10, wherein the intensifier is selected from the group consisting of: a metal iodide; a metal iodate; and formic acid.

12. The composition of claim 10, wherein the acid is selected from the group consisting of: mineral acids; organic acids, synthetic acids; modified acids; complexed acids; and combinations thereof.

13. The composition of claim 10, wherein the acid solution is selected from the group consisting of: HCl, Lysine-HCl, Urea-HCl, MEA-HCl, DEA-HCl, hydrofluoric acid, sulfuric acid, phosphoric acid, and p-toluene sulfonic acid.

14. The composition of claim 11, wherein the intensifier is selected from the group consisting of: cuprous iodide; potassium iodide; sodium iodide; lithium iodide; and combinations thereof.

* * * * *